(12) United States Patent
Palella et al.

(10) Patent No.: US 8,416,131 B2
(45) Date of Patent: Apr. 9, 2013

(54) CINEMATIC PARAMETER COMPUTING METHOD OF A SATELLITE NAVIGATION SYSTEM AND RECEIVING APPARATUS EMPLOYING THE METHOD

(75) Inventors: Nicola Matteo Palella, Rivolta d'Adda (IT); Piergiorgio Capozio, Cernusco sul Naviglio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 198 days.

(21) Appl. No.: 12/980,032

(22) Filed: Dec. 28, 2010

(65) Prior Publication Data

US 2012/0162006 A1 Jun. 28, 2012

(51) Int. Cl.
*G01S 19/42* (2010.01)
(52) U.S. Cl. ............................... 342/357.25
(58) Field of Classification Search ........... 342/357.25
See application file for complete search history.

(56) References Cited

U.S. PATENT DOCUMENTS

| | | | |
|---|---|---|---|
| 6,166,687 A * | 12/2000 | Ishikawa et al. | 342/357.2 |
| 7,433,434 B2 * | 10/2008 | Gifford et al. | 375/350 |
| 7,541,975 B2 | 6/2009 | Sever et al. | 342/357.15 |
| 2010/0026568 A1 | 2/2010 | Capozio et al. | 342/357.06 |
| 2010/0138147 A1 | 6/2010 | T'Siobbel | 701/201 |

* cited by examiner

*Primary Examiner* — Harry Liu
(74) *Attorney, Agent, or Firm* — Seed IP Law Group PLLC

(57) ABSTRACT

A cinematic parameter computing method of a satellite navigation system, including: receiving signals at a receiving apparatus from a plurality of satellites; processing said signals to provide received data; computing a first cinematic parameter value of said receiving apparatus according to a first computational method using said received data; computing a second cinematic parameter value of said receiving apparatus according to a second computational method using said received data and computing a distance value representing a difference between said first and second cinematic parameter values. The distance value is compared with a reference value providing a comparison result data and selecting one of first and second computational methods based on said comparison result data.

41 Claims, 8 Drawing Sheets

CINEMATIC PARAMETER COMPUTING METHOD OF A SATELLITE NAVIGATION SYSTEM AND RECEIVING APPARATUS EMPLOYING THE METHOD

BACKGROUND

1. Technical Field

The present disclosure relates to the field of global navigation satellite systems, including techniques for computing cinematic parameters, such as the position, velocity, acceleration, trajectory, etc., of the receiving apparatus operating in the global navigation satellite systems.

2. Description of the Related Art

A GNSS (Global Navigation Satellite System) receiver, for example a GPS (Global Positioning System), receives properly formatted electromagnetic signals transmitted by a constellation of satellites orbiting the earth. These signals contain information which can be used to compute receiver/user position, velocity and time, such as space vehicle ECEF (Earth Centered Earth Fixed) position, GPS time, transmitter clock error, ionospheric delay.

A so called tracker module of the GNSS receiver performs measurements about satellites in view. Two quantities of interest are detected: the difference between transmission and arrival times, i.e. the distance between receiver/user and the satellite (pseudorange) and the Doppler shift from nominal carrier frequency; the latter quantity is referred as "frequency".

To estimate the receiver (user's) position, velocity and time (PVT) two main approaches are employed according to known GPS techniques. One is the Least Square approach according to which the solution is reached using an estimating algorithm without dependence on past solution data. This algorithm is iterative, i.e. the solution is obtained executing the algorithm multiple times using the same actual tracker data. At every iteration a better solution is generally obtained, until the best estimate (the one minimizing the square of the error) is yielded. Position and velocity computations are loosely coupled, i.e. position derives by pseudoranges, while velocity is function of frequencies.

The other standard solution is to employ a Kalman Filter (KF). This is a recursive algorithm, in sense that solution at step t depends on the one obtained at t-1. Moreover PVT computation is tighter for Kalman Filter approach than for the Least Square method, i.e. position computation may be made dependent on a whole set of current measurements (pseudorange and dopplers) and from previous position and velocity.

In common practice, the Kalman Filter generally provides the optimal performance when the signal is affected by White Gaussian Noise, outperforming the Least Square algorithm. As an example, it has been shown that during 95% of the time, the Least Square estimation error is less than 15 m while the Kalman Filter estimation error is less than 4 m. This example refers to data acquired in a 6 hour long frame while receiver stood in optimal condition (i.e. static, full sky visibility, no reflections).

GNSS receivers are known that implement both algorithms: Least Square is used to deliver the first fix at the start-up of the receiver, after a long signal outage, while steady state working conditions see the Kalman Filter being chosen.

U.S. Patent Application No. 2010/0026568 describes a method for selecting the Least Square algorithm or the Kalman Filter algorithm in order to manage situations in which the GPS receiver has gone through a tunnel and is coming out of the same.

BRIEF SUMMARY

The Applicants have observed that due to its recursive nature, if a Kalman Filter gets a bias (caused by noisy or erroneous measurements, or false observations) it takes some time to recover, even when the cause of the error disappears. When the accumulated bias is wide, the time to recovery may be too much for user needs. This situation occurs, as an example, when the GPS receiver, mounted on board of a car, enters an area having many tall buildings producing satellite signals reflections and noise.

According to an embodiment, a cinematic parameter computing method of a satellite navigation system, comprises: receiving signals at a receiving apparatus from a plurality of satellites; processing said signals to provide received data; computing a first cinematic parameter value of said receiving apparatus according to a first computational method using said received data; computing a second cinematic parameter value of said receiving apparatus according to a second computational method using said received data; computing a distance value representing a difference between said first and second cinematic parameter values; comparing said distance value with a reference value providing a comparison result data; and selecting one of first and second computational methods based on said comparison result data. In an embodiment, the method further comprises: processing said received data to obtain at least a quality data representing at least a quality of the first computational method, wherein selecting one of first and second computational methods comprises: selecting the second computational method if the at least a quality is below a reference quality value. In an embodiment, said at least a quality data comprises at least one of the following parameters associated with said received data: number of used satellites among said plurality of satellites, dilution of precision DOP, and carrier to noise ratio CN0. In an embodiment, selecting one of first and second computational methods based on said comparison result data comprises a test and selection procedure including: performing an evaluation procedure to evaluate a first solution quality associated with the first cinematic parameter value and a second solution quality associated with the second cinematic parameter value; selecting one of first and second computational methods on the basis of said first and second qualities. In an embodiment, the method further comprises: updating a counting value if said comparison result data is greater than the reference value; selecting one of the first and second computational methods based on the counting value and on a counting reference value; resetting the counting value and selecting the second computational method if at least one of the following conditions is satisfied: said at least a quality is below the reference quality value, said comparison result data is less than the reference value. In an embodiment, selecting one of the first and second computational methods based on the counting value includes: selecting the first computational method if the counting value is greater than the counting reference value. In an embodiment, the method further comprises: enabling said test and selection procedure if the counting value is greater than a counting reference value. In an embodiment, said test and selection procedure includes: computing first method residuals associated with the first cinematic parameter value; computing a first metric value associated with said first method residuals representing said first solution quality; computing second method residuals associated with the second cinematic parameter value; computing a second metric value associated with said second method residuals representing said second solution quality; resetting the counting value and selecting the second computational method if the second metric value is less than the first metric value; and performing a further test and selection procedure if the second metric value is greater or equal than the first metric value. In an embodiment, said further test and selection procedure includes: computing an average value of absolute values of said second method residuals; resetting the counting value and selecting the second computational method if the average value is less than a first average residuals reference value; selecting the first computational method and resetting the counting value if said average value is greater than a second average residuals reference value that is greater than the first average residuals reference value; computing a further reference value obtained from a maximum value of absolute values of the second method residuals; comparing said distance value ($\|\Delta P\|$) with said further reference value if the average value is greater than or equal to the first average residuals reference value and is less than or equal to the second average residuals reference value, and generate a corresponding further comparison result data; resetting the counting value and selecting the second computational method if said further comparison result data indicates that the distance value is greater than the further reference value; and selecting the first computational method if said further comparison result data indicates that the distance value is less than or equal to the further reference value. In an embodiment, the method further comprises: computing a further maximum value of absolute values of the first method residuals; selecting the second computational method and resetting the counting value if said further maximum value is greater than a maximum residual reference value; enabling the test and selection procedure if said further maximum value is less than or equal to the maximum residual reference value. In an embodiment, said first computational method includes performing a zero-memory algorithm to compute the first cinematic parameter value of said receiving apparatus using a data subset of said received data associated with a single time instant; said second computational method includes performing an algorithm to compute the second cinematic parameter value of said receiving apparatus using a plurality of received data associated with a corresponding plurality of time instants. In an embodiment, the zero-memory algorithm is one of the following methods: Least Square algorithm LS, and Weighted Least Square algorithm WLS; the second computational method is a Kalman Filter algorithm. In an embodiment, the first and second cinematic parameter values represents one of the following receiving apparatus cinematic parameters: position, velocity. In an embodiment, the method further comprises: providing the first cinematic parameter value at an output of said receiver apparatus if the first computational method has been selected; and providing the second cinematic parameter value at the output of said receiver apparatus if the second computational method has been selected.

In an embodiment, a receiving apparatus of a satellite navigation system comprises: a receiving module configured to receive digitally modulated analog signals from a plurality of satellites and generate corresponding digital received signals; at least a processing module configured to process said digital received signals and generate received data; first computing module configured to compute a first cinematic parameter value of said receiving apparatus according to a first computational method using said received data; second computing module configured to compute a second cinematic parameter value of said receiving apparatus according to a second computational method using said received data; a selection module configured to select one of the first and the second computing methods; a computing and control module structured to: compute a distance value ($\|\Delta P\|$) representing a difference between said first and second cinematic parameter values; compare said distance value with a reference value providing a comparison result data; select one of first and second computational methods based on said comparison result data and via said selection module. In an embodiment, said computing and control module is further structured to: process said received data to obtain at least a quality data representing at least a quality of the first computational method; selecting the second computational method if the at least a quality is below a reference quality value. In an embodiment, said at least a quality data comprises at least one of the following parameters associated with said received data: number of used satellites among said plurality of satellites, dilution of precision DOP, and carrier to noise ratio CN0. In an embodiment, the computing and control module is further structured to perform a test and selection procedure including: performing an evaluation procedure to evaluate a first solution quality associated with the first cinematic parameter value and a second solution quality associated with the second cinematic parameter value; selecting one of first and second computational methods on the basis of said first and second qualities. In an embodiment, said first computational method includes performing a zero-memory algorithm to compute the first cinematic parameter value of said receiving apparatus using a data subset of said received data associated with a single time instant; said second computational method includes performing an algorithm to compute the second cinematic parameter value of said receiving apparatus using a plurality of received data associated with a corresponding plurality of time instants. In an embodiment, the zero-memory algorithm is one of the following methods: Least Square algorithm LS, Weighted Least Square algorithm WLS; and said second algorithm is a Kalman Filter algorithm. In an embodiment, the first and second cinematic parameter values represent one of the following receiving apparatus cinematic parameter: position and velocity. In an embodiment, the receiving apparatus further comprises an output connected to said selection module and structured to: provide the first cinematic parameter value if the first computational method has been selected; provide the second cinematic parameter value if the second computational method has been selected.

In an embodiment, a method comprises: receiving signals at a receiving apparatus from a plurality of satellites; and under control of the receiving apparatus, processing said signals to provide received data; determining a first cinematic parameter value of said receiving apparatus according to a first computational method using said received data; determining a second cinematic parameter value of said receiving apparatus according to a second computational method using said received data; determining a difference value representing a difference between said first and second cinematic parameter values; comparing said difference value with a difference threshold; and selecting one of first and second computational methods based at least in part on said comparison. In an embodiment, the method further comprises: determining a reliability of the first computational method based on the received data, wherein selecting one of first and second computational method, comprises selecting the second computational method if the determined reliability is below a reference reliability threshold. In an embodiment, the determining the reliability of the first computation method comprises determining the reliability based on at least one of the following parameters associated with said received data: a number of used satellites among said plurality of satellites, a dilution of precision DOP, and a carrier to noise ratio CN0. In an embodiment, selecting one of first and second computational methods comprises a first test and selection procedure including: evaluating a first solution quality associated with the first cinematic parameter value and a second solution quality associated with the second cinematic parameter value; and selecting one of first and second computational methods on the basis of said first and second qualities. In an embodiment, the method further comprises: updating a counting value if said determined reliability is greater than the reference reliability threshold; selecting one of the first and second computational methods based on the counting value and on a counting reference value; resetting the counting value and selecting the second computational method if at least one of the following conditions is satisfied: said determined reliability is below the reference reliability threshold; and said difference value is less than the difference reference threshold. In an embodiment, selecting one of the first and second computational methods based on the counting value includes: selecting the first computational method if the counting value is greater than the counting reference value. In an embodiment, the method further comprises: enabling said first test and selection procedure if a counting value is greater than a counting reference value. In an embodiment, said first test and selection procedure includes: computing first method residuals associated with the first cinematic parameter value; computing a first metric value associated with said first method residuals representing said first solution quality; computing second method residuals associated with the second cinematic parameter value; computing a second metric value associated with said second method residuals representing said second solution quality; resetting the counting value and selecting the second computational method if the second metric value is less than the first metric value; and performing a second test and selection procedure if the second metric value is greater or equal than the first metric value. In an embodiment, said second test and selection procedure includes: computing an average value ($RAVG_{KF}$) of absolute values of said second method residuals; resetting the counting value and selecting the second computational method if the average value is less than a first average residuals reference value; selecting the first computational method and resetting the counting value if said average value is greater than a second average residuals reference value that is greater than the first average residuals reference value; computing a further reference value obtained from a maximum value of absolute values of the second method residuals; comparing said distance value with said further reference value if the average value is greater than or equal to the first average residuals reference value and is less than or equal to the second average residuals reference value, and generate a corresponding further comparison result data; resetting the counting value and selecting the second computational method if said further comparison result data indicates that the difference value is greater than the further reference value; and selecting the first computational method if said further comparison result data indicates that the difference value is less than or equal to the further reference value. In an embodiment, the method further comprises: computing a further maximum value of absolute values of the first method residuals; selecting the second computational method and resetting the counting value if said further maximum value is greater than a maximum residual reference value; enabling the first test and selection procedure if said further maximum value is less than or equal to the maximum residual reference value. In an embodiment, said first computational method includes computing the first cinematic parameter value of said receiving apparatus using a data subset of said received data associated with a single time instant; and said second computational method includes computing the second cinematic parameter value of said receiving apparatus using a plurality of received data associated with a corresponding plurality of time instants. In an embodiment, the first computational method comprises one of a Least Square algorithm LS and a Weighted Least Square algorithm WLS; and the second computation method algorithm is a Kalman Filter algorithm. In an embodiment, the first and second cinematic parameter values represent one of the following receiving apparatus cinematic parameters: position and velocity. In an embodiment, the method further comprises: providing the first cinematic parameter value at an output of said receiver apparatus if the first computational method has been selected; and providing the second cinematic parameter value at the output of said receiver apparatus if the second computational method has been selected.

In an embodiment, a receiving apparatus comprises: a receiving module configured to receive digitally modulated analog signals from a plurality of satellites and generate corresponding digital received signals; at least a processing module configured to process said digital received signals and generate received data; a first computing module configured to compute a first cinematic parameter value of said receiving apparatus according to a first computational method using said received data; a second computing module configured to compute a second cinematic parameter value of said receiving apparatus according to a second computational method using said received data; and an output control module configured to: compute a difference value representing a difference between said first and second cinematic parameter values; compare said difference value with a reference difference threshold; and select one of first and second computational methods based on said comparison. In an embodiment, said output control module is configured to: process said received data to determine a reliability of the first computational method, wherein selecting one of the first and second computational methods is based on the determined reliability of the first computational method. In an embodiment, said determined reliability of the first computational method is based on at least one of the following parameters associated with said received data: number of used satellites among said plurality of satellites; dilution of precision DOP; and carrier to noise ratio CN0. In an embodiment, the output control module is configured to perform a first test and selection procedure including: evaluating a first solution quality associated with the first cinematic parameter value and a second solution quality associated with the second cinematic parameter value; and selecting one of first and second computational methods on the basis of said first and second qualities. In an embodiment, said first computational method includes determining the first cinematic parameter value of said receiving apparatus using a data subset of said received data associated with a single time instant; and said second computational method includes determining the second cinematic parameter value of said receiving apparatus using a plurality of received data associated with a corresponding plurality of time instants. In an embodiment, the first computation method is one of the following methods: Least Square algorithm LS and Weighted Least Square algorithm WLS; and the second computational method is a Kalman Filter algorithm. In an embodiment, the first and second cinematic parameter values represent one of the following receiving apparatus cinematic parameters: position and velocity. In an embodiment, the receiving apparatus comprises: a selection module controlled by the output control module; and an output coupled to said selection module and structured to: provide the first cinematic parameter value if the first computational method has been selected; and provide the second cinematic parameter value if the second computational method has been selected.

In an embodiment, a method comprises: receiving signals from a plurality of satellites; extracting information from the received signals; selecting between first and second methods of determining a cinematic parameter using the extracted information, the selecting being based at least in part on a difference between results of the first and second methods of determining the cinematic parameter and performed by one or more configured processing devices. In an embodiment, the method further comprises determining a reliability of at least one of the methods of determining the cinematic parameter, wherein the selecting is based at least in part on the determined reliability. In an embodiment, the method further comprises determining a reliability of one of the methods of determining the cinematic parameter based on the extracted information, wherein the reliability is determined independent of a result of the one of the methods.

In an embodiment, a method comprises: receiving signals from a plurality of satellites; extracting information from the received signals; determining whether a first method of generating a cinematic parameter from the extracted information is reliable independent of a result of the first method of generating the cinematic parameter; when it is determined that the first method of generating the cinematic parameter is unreliable, selecting a second method of generating the cinematic parameter from the extracted information; and when it is determined that the first method of generating the cinematic parameter is reliable, selecting one of the first and second methods of determining the cinematic parameter based at least in part on a difference between results of the first and second methods of determining the cinematic parameter, wherein the determining and selecting are performed by one or more configured processing devices. In an embodiment, the cinematic parameter is a position, the difference is an absolute value of a distance between a result of the first method and the selecting one of the first and second method comprises comparing the absolute value of the distance to a threshold. In an embodiment, the first method comprises a least-squares method and the second method comprises a Kalman filtering method.

In an embodiment, a system comprises: means for receiving digitally modulated analog signals from a plurality of satellites; means for extracting data from the received signals; first means for generating cinematic parameters based on the extracted data; second means for generating cinematic parameters based on the extracted data; and means for selecting an output cinematic parameter coupled to the first means for generating cinematic parameters and to the second means for generating cinematic parameters, and including means for generating differences between cinematic parameters generated by the first means for generating cinematic parameters and cinematic parameters generated by the second means for generating cinematic parameters. In an embodiment, the means for selecting an output cinematic parameter comprises means for determining a reliability of the first means for generating cinematic parameters based on the extracted data. In an embodiment, the means for selecting an output cinematic parameter comprises means for evaluating a cinematic parameter generated by the second means for generating cinematic parameters. In an embodiment, the means for selecting an output cinematic parameter comprises a controller configured to control a switch.

BRIEF DESCRIPTION OF THE SEVERAL VIEWS OF THE DRAWINGS

Non-limiting and non-exhaustive embodiments are described with reference to the following drawings, wherein identical or analogous components or modules are indicated with the same reference numbers throughout the various views unless otherwise specified or the context indicates otherwise. The relative positions of elements in the drawings are not necessarily drawn to scale. For example, the various elements may be connected as illustrated, connected in other ways, and connected with other intervening elements. Some elements in the illustrations include electronic hardware, software, and cooperative combinations of electronic hardware and software. The illustrations of particular elements of the figures have been selected for ease of recognition in the drawings. One or more embodiments are described hereinafter with reference to the accompanying drawings in which.

DETAILED DESCRIPTION

Figure 1:
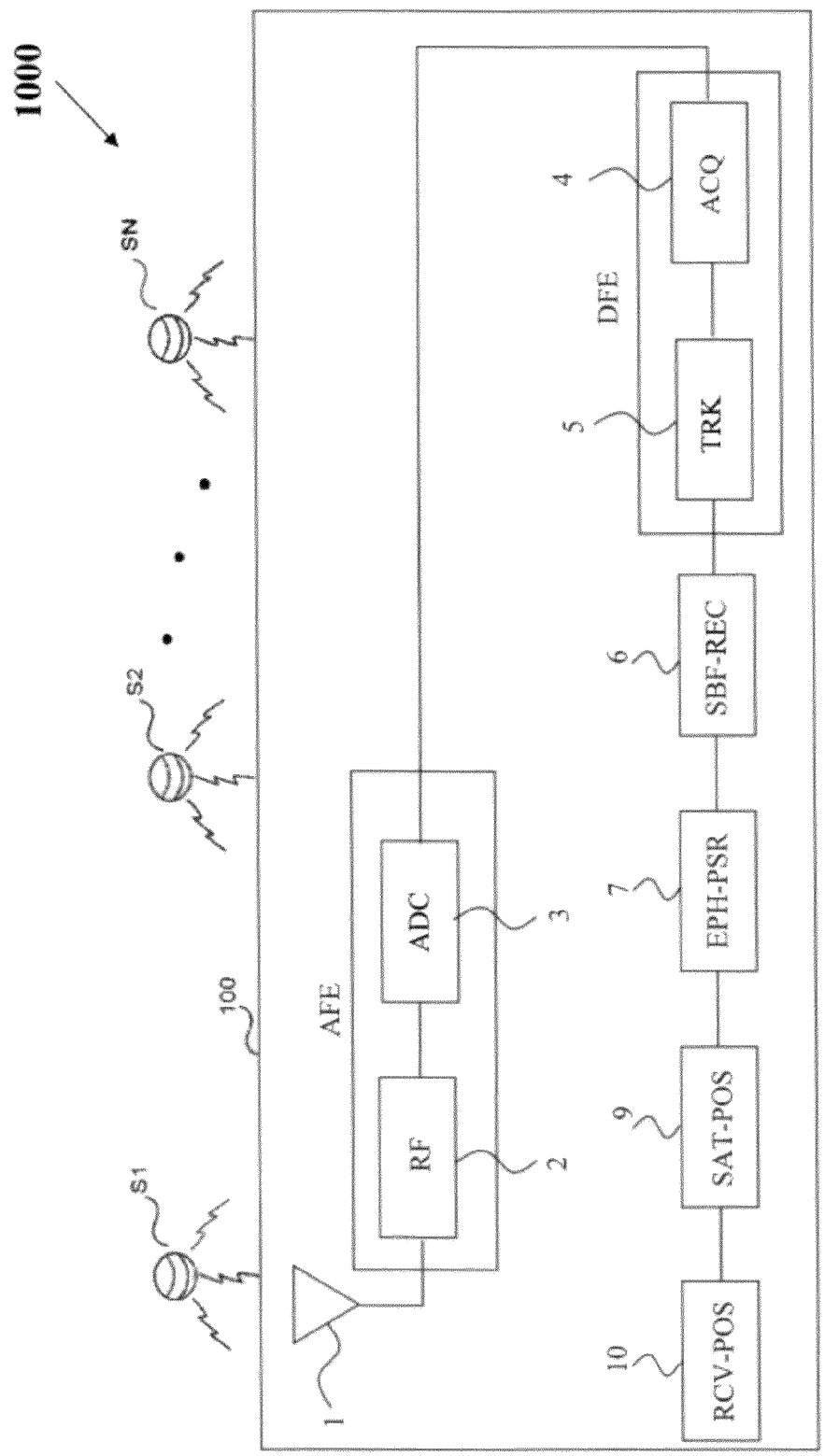
FIG. 1 schematically illustrates a global navigation satellite system according to an embodiment comprising a constellation of satellites and a receiving apparatus.

In the following description, certain details are set forth in order to provide a thorough understanding of various embodiments of devices, methods and articles. However, one of skill in the art will understand that other embodiments may be practiced without these details. In other instances, well-known structures and methods associated with, for example, memories, controllers, processors, receivers, global navigation satellite systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claims.

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings. Geometric references are not intended to refer to ideal embodiments.

FIG. 1 schematically shows a GNSS system (Global Navigation Satellite System) 1000 such as, for example the Global Positioning System (GPS), the Global'naya Navigatsionnaya Sputnikovaya Sistema (GLONASS), Galileo System, or other kinds of positioning systems based on satellites. The global navigation satellite system 1000 includes a constellation of Satellites S1-SN and at least one receiving apparatus 100.

In one embodiment, the receiving apparatus 100 includes an antenna 1, an analog front-end module AFE, having a radio frequency stage (RF) 2, and an analog-to-digital converter (ADC) 3, implementable through hardware modules. The receiving apparatus 100 further includes a digital front-end module DFE, including an acquisition module (ACQ) 4, and a tracking module (TRK) 5. Moreover the receiving apparatus 100 is provided with a sub-frame recovery module (SBF-REC) 6, an ephemeris processing and pseudo-range computing module (EPH-PSR) 7, a satellite position computing module (SAT-POS) 9 and a receiver (user's) position computing module (USR-POS) 10.

In one embodiment, the acquisition module 4 and the tracking module 5 can be implemented through hardware while the remaining modules from 6 to 10 can be implemented by respective software. The receiving apparatus 100 is provided with a central processing unit P, memories M (mass memory and/or work memory) and their interfaces (not shown in the figures) which may include one or more microprocessors, microcontrollers, etc., for implementing software modules, for example using a microprocessor to execute instructions stored in a memory.

The following embodiments are described with reference to GPS technology, but they are also implementable in accordance with other types of GNSS systems. When the receiving apparatus 100 is operating, the antenna 1 receives a plurality of signals from one or more satellites S1-SN of the satellite constellation operating in the system 1000. For example, these signals may be modulated on a 1.5 GHz carrier, with received signals carrying a pseudo-random code and a navigation data message.

The pseudo-random code, known as CA code, for example at 1 MHz, is used to differentiate one satellite from another and allows the receiving apparatus 100 to measure the time when the signal was transmitted by the corresponding satellite.

The navigation data message carries data (for example at a bit rate of 50 Hz) and may be modulated according to the Binary Phase Shift Keying technique (BPSK), etc. Moreover the navigation data message may be hierarchically divided into frames and sub-frames and carry various information among which a plurality of parameters may be used in determining the orbit and therefore the position of the satellites.

The radio frequency stage 2 operates on the signals received at the antenna 1 (analog type) converting them in base band or at intermediate frequency band. Converter 3 converts the analog base band signals into corresponding digital signals. The acquisition module 4 detects, based on the digital output signals from the converter 3, which satellites in the S1-SN constellation are in sight, that is, for which satellites a signal suitable for identification is received.

Further the acquisition module 4 detects a plurality of parameters associated with the satellites and the acquisition module 4 is useful for satellite tracking over time. The tracking module 5 has several channels, each allocating the signal of a different satellite. For example, the tracking module 5 may be configured to perform a frequency tracking loop. In accordance with another embodiment the tracking module 5 may be configured to perform a phase tracking loop.

The tracking module 5 is structured to provide data to the subframe recovery module 6 in the form of a discrete-time sequence of couples of samples, referred as $\{I,Q\}$. Each $\{I,Q\}$ sample is the result of an in-phase and quadrature coherent integration over, as an example, each 20 ms bit period from a correlator (not shown) included in the tracking module 5. According to a Binary Phase Shift Keying modulation technique (BPSK) each couple of samples $\{I,Q\}$ represent a transmitted bit.

In the field of digital communication theory, each $\{I,Q\}$ sample can be also interpreted as a phasor, considering the I value and the Q value as the real and imaginary part of a two components vector in the complex Cartesian plane.

Moreover, for each received satellite and at any moment, in the tracking module 5 the Doppler frequency and the travel time of the GPS signal transmitted by a satellite S1-SN is determined. The subframe recovery module 6 decodes the various sub-frames of the navigation data message of each received satellite by means of suitable algorithms. The ephemeris processing and pseudo-range computing module 7 stores the orbit for each satellite in the form of ephemeris data. The ephemeris processing and pseudo-range computing module 7 computes distances between the satellites and the receiver 100; such distances are called pseudo-ranges.

The satellite position computing module 9 computes the positions, expressed in 3D coordinates, of the satellites at the time of transmission. In this embodiment, the satellite position computing module 9 operates based on: the ephemeris data (which are provided by the ephemeris processing and pseudo-range computing module 7) and the GPS system time downloaded within the navigation data message and hence provided by the sub-frame recovery module 6.

By means of a triangulation algorithm and using the computed pseudo-ranges, the receiver position computing module 10 computes the position of the receiving apparatus 100. Herein below the position of the receiving apparatus 100 (generally substantially coincident with the user's position) will be referred to as a fix according to the technical field.

Figure 2:
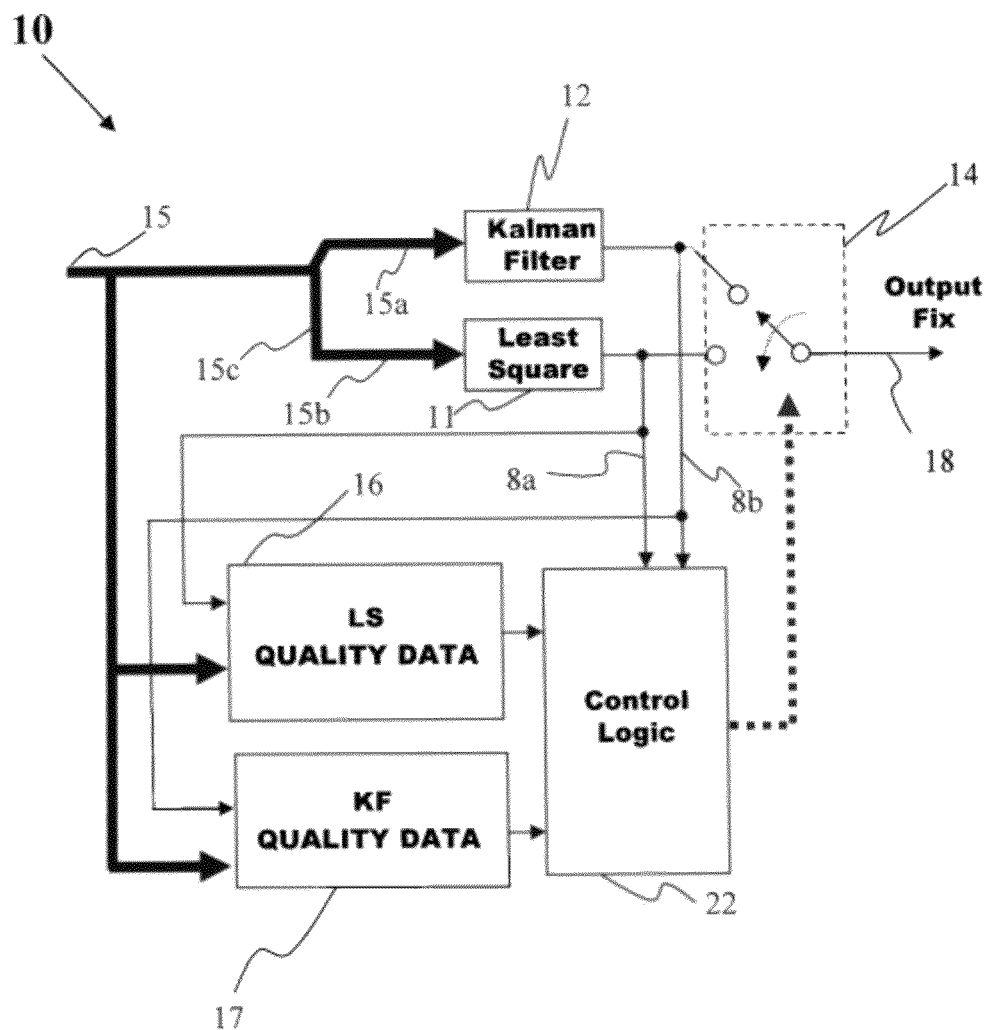
FIG. 2 schematically illustrates an embodiment of a position computing module which can be employed in said receiving apparatus.

FIG. 2, through functional blocks, shows the position computing module 10 according to an embodiment.

More specifically, the position computing module 10, which can be a software module, comprises a first fix computation module 11 and a second fix computation module 12. According to the example described, the first fix computation module 11 is structured to perform an algorithm to compute fix in start-up conditions, that is for example, when the receiving apparatus 100 is turned on, when for any reason, the content of the memory related to the fix computing software from position values or other quantities previously computed is reset, etc. According to an example, the computing procedure used in the first fix computation module 11 is the Least Square (LS) algorithm (known to one skilled in the art). The LS algorithm is an algorithm which generally computes the position of the receiving apparatus 100 using a single set of current measures without using other information or data related to receiver position, time and velocity estimates at previous time instants. In some embodiments, a Weighted Least Square algorithm can be employed.

According to the example described, the second fix computation module 12 is such to evaluate the fix of the receiving apparatus 100 in a current instant based on a combination of status variables (i.e., quantities connected to measures previously carried out) stored along with those measured at the current instant. These status variables refer to the positions of the receiving apparatus 100 or to their combination with other parameters (for example the velocity of the receiving apparatus 100). According to an embodiment, the second module 12 is a Kalman filter module (KF).

Kalman filter module 12, known by one skilled in the art, is based on, for example, an internal memory which registers such status variables and computes the current position by a weighted linear combination. In an embodiment, the Kalman filter is structured to perform a weighted linear combination between a first term corresponding to the position extrapolation based on the prior knowledge and a second term which is the computed position based on the current measures (the latest measures in chronological order) without taking into account past events.

Statistically speaking, Kalman filter module 12 may determine instant by instant the best linear combination according to the least root-mean-square error. It should be noted that the Kalman filter module 12 operates starting from at least one past measure.

In FIG. 2 lines 15 and 15a-15c symbolically indicate data flow to the position computing module 10. Such data includes satellite pseudorange and Doppler measurements, computed satellites positions, computed satellites velocities, and received signals powers of the satellites.

In the follow reference is made to an example embodiment in which the first fix computational module 11 is a LS module and the second fix computational module 12 is a Kalman filter module.

Moreover, in FIG. 2 a selection block 14 represents the possibility of selecting the fix computational method by means of the LS module 11 or the Kalman filter module 12.

The receiver position computing module 10 further comprises a first quality evaluation module 16 (LS QUALITY DATA) structured to produce at least a quality parameter of the solution (position) provided by the LS module 11. Moreover the position computing module 10 comprises a second quality evaluation module 17 (KF QUALITY DATA) structured to produce at least a quality parameter of the solution (position) provided by the Kalman filter module 12.

The receiver position computing module 10 is further provided with a control module 22 (Control Logic) in which a control logic is implemented. Based on the outputs of the first and second quality evaluation modules 16 and 17, the control module 22 operates a selection (acting on the selection block 14) between the fix calculation by means of first the LS module 11 or by means of the Kalman filter module 12. The output fix may be made available at the output of the receiver position computing module 10.

It is to be noted that the receiver position computing module 10 can be implemented, for example, by integrating electronic components capable of performing the calculations and the decision and output logic on a silicon chip. Further lines 8a and 8b indicate data flow from the Kalman filter module 12 and the LS module 11 towards the control logic 22, the first quality evaluation module 16 and the second quality evaluation module 17.

Figure 3:
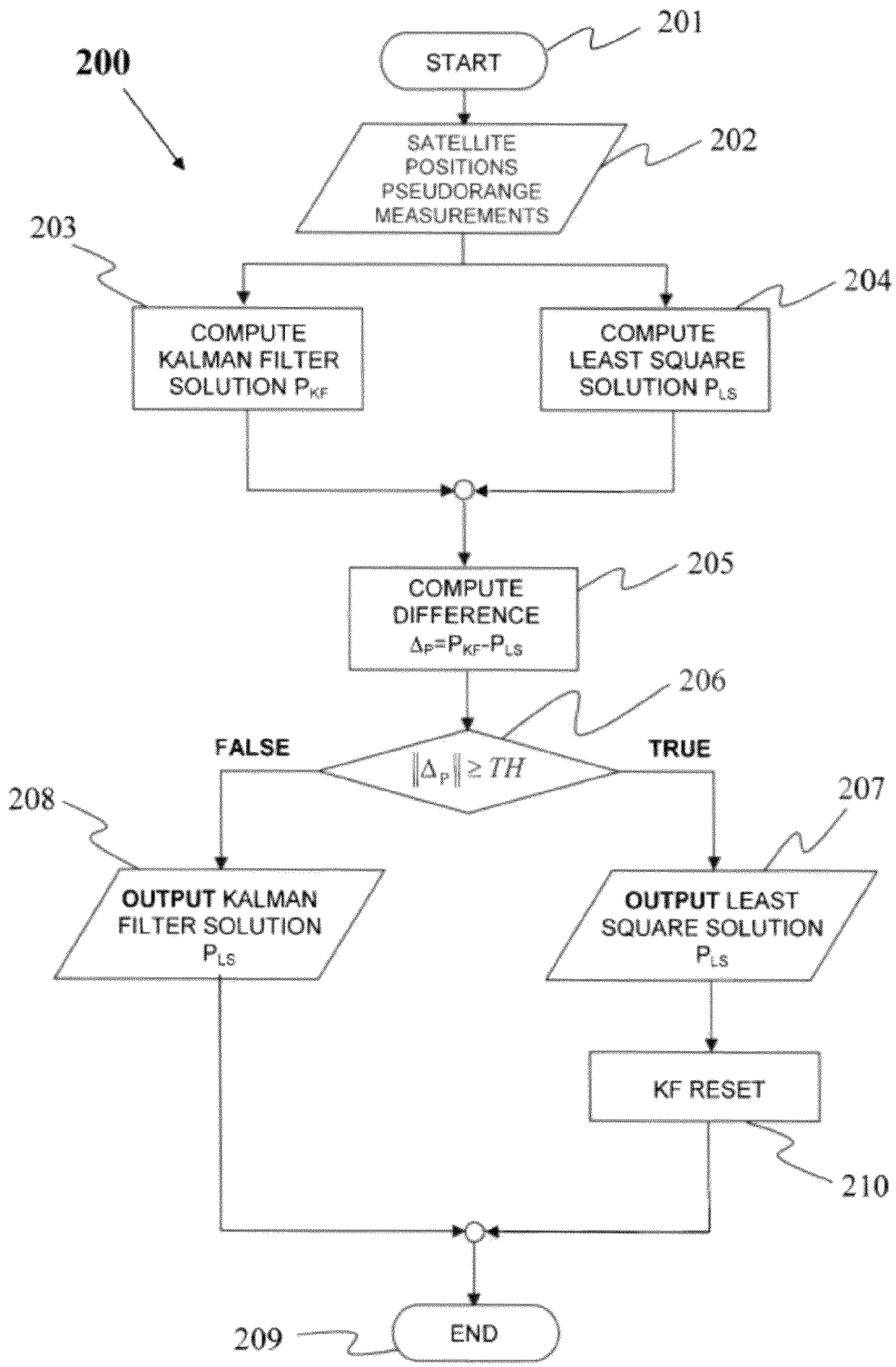
FIG. 3 shows a flowchart of an embodiment of a position computing method.

FIG. 3 is a flowchart of an embodiment of a position computing method 200 which can be as an example carried out by the receiver position computing module 10. The operating method 200 begins with a START step 201 and finishes with an END step 209.

At a data input step 202 the receiver position computing module 10 receives via line 15 computed satellite positions and pseudo-range measurements. The Kalman filter module 12 computes a first receiver (user's) position $P_{KF}$, (first fix computational step 203), and the LS module 11 computes a second receiver (user's) position $P_{LS}$ (second fix computational step 204). Both first and second receiver positions $P_{KF}$ and $P_{LS}$ refer to the same time instant. It is observed that the first and second receiver positions $P_{KF}$ and $P_{LS}$ may be three element vectors representing the receiver (user's) position in a suitable reference coordinate system (e.g. World Geodetic System, WGS-84), etc.

In a position distance computing step 205, a position distance $\Delta P$ representing the vectorial difference between the first receiver position $P_{KF}$ and the second receiver position $P_{LS}$ is evaluated.

In a comparing step 206, a metric $\|\Delta P\|$ associated with the position distance $\Delta P$ vector is computed and compared with a distance threshold TH. According to an example the metric can be the Cartesian distance between the first and second receiver position vectors. If the metric $\|\Delta P\|$ is greater than or equal to the distance threshold TH (branch TRUE) the selection block 14 selects the second receiver position $P_{LS}$ computed by the LS module 11. The selected second receiver position $P_{LS}$ is then provided as output of the receiver position computing module 10 at an output 18 (first output step 207). After the first output step 207 a resetting step 210 is performed. In the resetting step 210 the status of the Kalman filter module 12 is reset and the second receiver position $P_{LS}$ is used as initial status of the Kalman filter module 12 for subsequent receiver position computation.

On the contrary if the metric $\|\Delta P\|$ is less than the distance threshold TH (branch FALSE) the selection block 14 selects the first receiver position $P_{KF}$ computed by the Kalman filter module 12. The selected first receiver position $P_{KF}$ is then provided at the output 18 (second output step 208). According to an embodiment of FIGS. 2 and 3 the position distance computing step 205 and the comparing step 206 may be performed by the control module 22 which accordingly operates the selection block 14.

Moreover, it is observed that according to an embodiment of FIG. 3 of the position computing method the first quality evaluation module 16, and the second quality evaluation module 17 may not be present or operated and corresponding outputs are neglected by the control module 22.

It is noticed that the condition where the metric $\|\Delta P\|$ is greater than or equal to the distance threshold potentially indicates a misbehavior of the Kalman filter module 12, indicating an unreliable computed receiver (user's) position $P_{KF}$ substantially different from the true receiver (user's) position. In this condition the selection of the receiver (user's) position $P_{LS}$ as the initial status of the Kalman filter module 12 may improve the accuracy of the subsequent computation of the receiver (user's) positions (i.e., the fixes).

In accordance with an embodiment of FIG. 3, typically the computed receiver (user's) position $P_{KF}$ may be selected as the output of the position computing module 10 and the corresponding Kalman filter module 12 implements the preferred position computing method. The second fix computational step 204 performed by the LS module 11 provides a receiver (user's) position which is used within the position distance computing step 205 with purpose of monitoring the reliability of the typical receiver (user's) position $P_{KF}$; the receiver (user's) position $P_{LS}$ replaces the receiver (user's) position $P_{KF}$ in case the condition of the comparing step 206 is TRUE.

Figure 4:
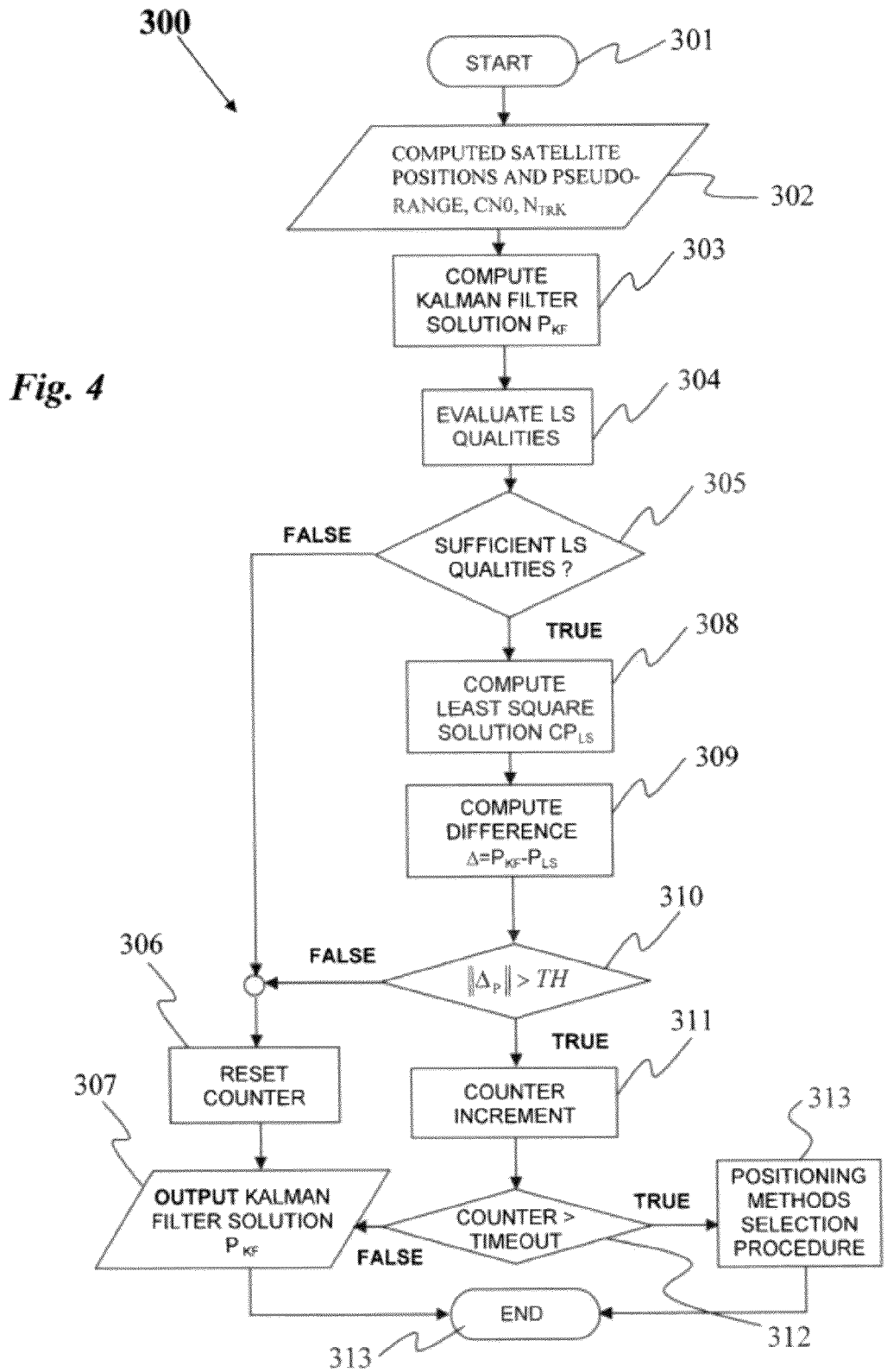
FIG. 4 shows a flowchart of an embodiment of a position computing method.

FIG. 4 depicts a flowchart of an embodiment of a position computing method 300 which can be as an example carried out by the receiver position computing module 10. The operating method 300 begins with a START step 301 and finishes with an END step 314.

At a further data input step 302 the receiver position computing module 10 receives via line 15 a plurality of data comprising computed satellite positions and pseudo-range measurements and, according to a particular example, additionally receives a carrier to noise ratio CN0 associated to each received satellite S1-SN signal, a number $N_{TRK}$ of tracked satellites. The Kalman filter module 12 computes a receiver KF position $P_{KF}$, (KF fix computational step 303).

In the quality evaluation step 304 the first quality evaluation module 16 processes the plurality of data and provides at least a quality parameter representing the reliability of the position solution provided by the LS module 11 independent of the results of the position computing. According to an example the at least a quality parameter may include dilution of precision (DOP), number of used satellites $N_{SAT}$ in the computation of the position $P_{LS}$ computed by the LS module 11, a CN0 average, etc.

Moreover, a quality step 305 is carried out by evaluating if the position solution to be provided by the LS module 11 is of sufficient quality. Particularly, this quality step 305 is carried out using the above mentioned quality parameters representing the reliability of the position solution provided by the LS module 11 independent of the solution. In one embodiment, the quality parameters are compared with corresponding thresholds to evaluate if the dilution of precision is lower than a DOP threshold, the number of used satellites $N_{SAT}$ in the computation of the position $P_{LS}$ are higher than a satellite number thresholds, and the CN0 average is higher than a first CNO threshold. According to another example, a further condition includes checking if each CN0 associated to each satellite belonging to the set of used satellite, is higher than a second CN0 threshold. In accordance with an example embodiment, in the quality step 305 the following conditions are checked:

$$N_{SAT}>4; DOP<5; CNO\ average>25\ dB \quad (1)$$

In the example embodiment of Equation 1, if all the above quality conditions (1) are not satisfied (branch FALSE in FIG. 4) a reset of a counting value (counter reset step 306) is performed and the selection block 14 selects the receiver KF position $P_{KF}$ computed by the Kalman filter module 12. The selected KF position $P_{KF}$ is then provided as output of the receiver position computing module 10 at the output 18 (KF output step 307).

On the contrary, if all the above quality conditions (1) are satisfied (branch TRUE in FIG. 4) a LS fix computational step 308 is performed, wherein the LS module 11 computes a receiver LS position $P_{LS}$. Both KF and LS positions $P_{KF}$ and $P_{LS}$ refer to the same time instant.

It is observed that if all the above mentioned quality conditions (1) are satisfied, then the receiver position computation performed by LS module 11 may be considered reliable.

Moreover, after the second fix computational step 308 a position distance computing step 309 and a comparing step 310 are performed. It is noticed that the position distance computing step 309 and the comparing step 310 may be identical or analogous to the position distance computing step 205 and the comparing step 206, respectively, described with reference to FIG. 3.

In the position distance computing step 309 a position distance $\Delta P$ representing the vectorial difference between the receiver KF position $P_{KF}$ and the receiver LS position $P_{LS}$ is evaluated. In the comparing step 310 the metric $\|\Delta P\|$ associated with the position distance $\Delta P$ vector is computed and compared with the distance threshold TH. If the metric $\|\Delta P\|$ is less than the distance threshold TH (branch FALSE) the above mentioned counter reset step 306 and KF output step 307 are performed. According to an embodiment, the same metric defined in connection with the comparing step 206 can be used.

On the contrary, if the metric $\|\Delta P\|$ is greater than or equal to the distance threshold TH (branch TRUE) the counting value is updated, particularly, incremented (counter incrementing step 311) and a counting test step 312 is performed. In the counting test step 312, the counting value resulting from the counter incrementing step 311 is compared with a count threshold TIMEOUT. If the counting value is lower than the count threshold TIMEOUT (branch FALSE) the KF output step 307 is performed. If the counting value is equal to or greater than the count threshold TIMEOUT a positioning methods selection procedure 313 is enabled, for example as indicated in FIG. 4.

The positioning methods selection procedure 313 includes further tests performed to evaluate the quality of the receiver position solutions computed by the Kalman filter module 12, and the LS module 11, in order to perform a conditional selection between the KF position $P_{KF}$ and the LS position $P_{LS}$. The qualities of the position solutions are evaluated at least in part on the basis of the position solutions computed by the correspondent Kalman filter module 12 or the LS module 11.

According to another embodiment, the positioning methods selection procedure 313 unconditionally selects the LS position $P_{LS}$ computed by the LS module 11 and, such LS position $P_{LS}$ is then provided at the output 18 without checking the quality of the receiver position solutions computed by the Kalman filter module 12, and the LS module 11.

With reference to the above described embodiment of FIG. 4, it is observed that the quality step 305 allows evaluating the quality of the LS position $P_{LS}$ independent of the result in order to determine if the computed LS position $P_{LS}$ may be used as reliable monitoring quantity and employed to replace the KF position provided at the output 18 of the position computing module 10.

An embodiment of a positioning methods selection procedure 313 will be now described with reference to FIG. 5.

Figure 5:
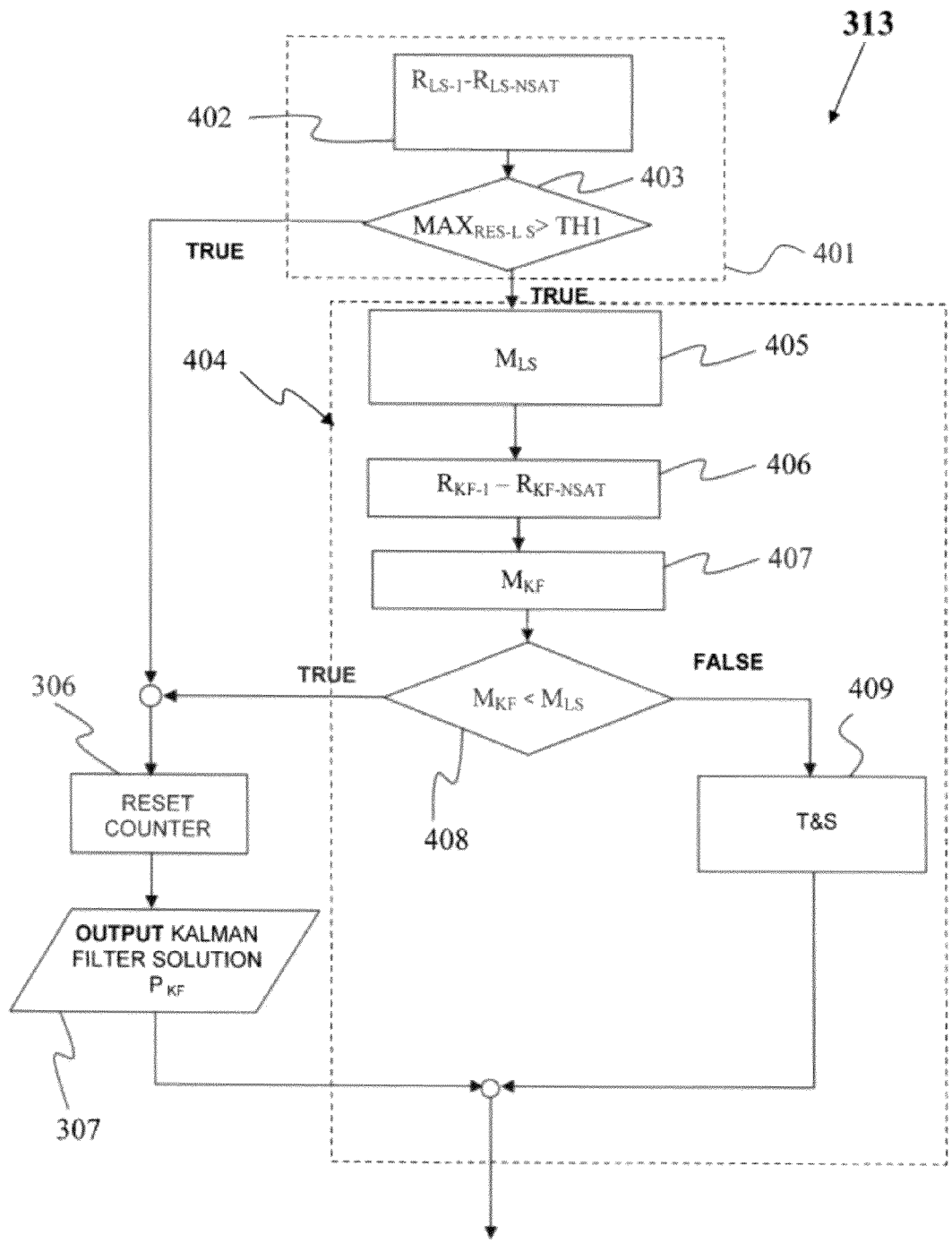
FIG. 5 illustrates a flowchart of an embodiment of a positioning method selection procedure.

In accordance with the example embodiment of FIG. 5 positioning methods selection procedure 313 can include a test and selection enabling procedure 401 wherein a residual value for each used satellite and associated with the receiver LS position $P_{LS}$ is computed, so providing a plurality of residual values $R_{LS\_1}$-$R_{LS\_NSAT}$ (LS residual computational step 402). A residual value may be computed as the difference between the pseudorange measured in the tracker module 5 of FIG. 1 and an estimated pseudorange. The estimated pseudorange may be computed as geometric distance between the receiver LS position $P_{LS}$ (LS fix computational step 308) and the associated satellite position generated by the satellite position computing module 9. The estimated pseudorange and the residual values associated with the receiver LS position $P_{LS}$ can be computed by the first quality evaluation module 16 (FIG. 2).

Moreover, in an LS test step 403 a maximum absolute value of said residual values $R_{LS\_1}$-$R_{LS\_NSAT}$, $MAX_{RES-LS}$ is selected, and compared with a residual threshold TH1. If the $MAX_{RESLS}$ is greater than the residual threshold TH1, then the above mentioned counter reset step 306 and KF output step 307 are performed. On the contrary, if the $MAX_{RESLS}$ is less than or equal to the residual threshold TH1, then a test and selection procedure 404 is enabled.

The test and selection procedure 404 comprises an LS metric computational step 405, a KF residual computational step 406 and a KF metric computational step 407. In the LS metric computational step 405 a first metric $M_{LS}$ associated with the residual values $R_{LS\_1}$-$R_{LS\_NSAT}$ resulting from the LS test step 403 is computed. According to an embodiment, such metric is a Root Mean Square value of the residual values $R_{LS\_1}$-$R_{LS\_NSAT}$. In the KF residual computational step 406 a residual value for each used satellite and associated with the receiver KF position $P_{KF}$ is computed, so providing another plurality of residual values $R_{KF\_1}$-$R_{KF\_NSAT}$. In the KF metric computational step 407 a second metric $M_{KF}$ associated with the residual values $R_{KF\_1}$-$R_{KF\_NSAT}$ is computed. In accordance with another embodiment, the test and selection enabling procedure 401 can be omitted and, in this case, the LS residual computational step 402 may be performed within the test and selection procedure 404 while the LS test step 403 is avoided.

The test and selection procedure 404 as illustrated comprises a metric comparison step 408 wherein the second metric $M_{KF}$ is compared to the first metric $M_{LS}$. It is noticed that the metric comparison step 404 represents a comparison of the qualities associated to the receiver LS position $P_{LS}$ and the receiver KF position $P_{KF}$. If the second metric $M_{KF}$ is less than the first metric $M_{LS}$ (branch TRUE) then the above mentioned counter reset step 306 and KF output step 307 are performed. On the contrary, if the second metric $M_{KF}$ is greater than or equal to the first metric $M_{LS}$ (branch FALSE) a further test and selection procedure 409 may be enabled.

The further test and selection procedure 409 includes further tests performed to evaluate the quality of the receiver position solution computed by the Kalman filter module 12, in order to perform a conditional selection between receiver KF position $P_{KF}$ and the receiver LS position $P_{LS}$. According to another embodiment, the further test and selection procedure 409 unconditionally selects the receiver LS position $P_{LS}$ computed by the LS module 11 and, such receiver LS position $P_{LS}$, is then provided at the output 18.

Figure 6:
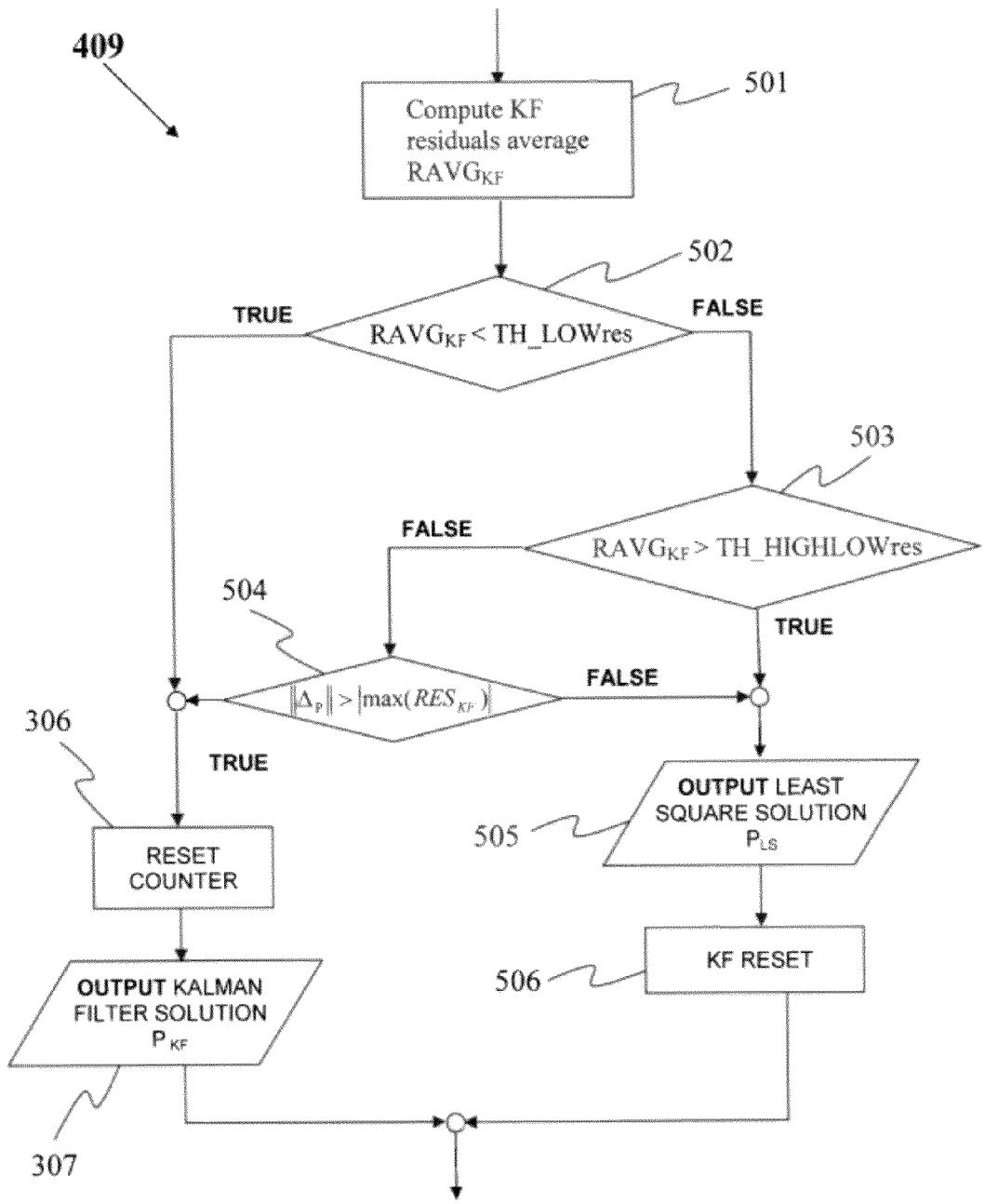
FIG. 6 shows an embodiment of a test and selection procedure which can be carried out by an embodiment of a positioning method selection procedure.

With reference to FIG. 6, an embodiment of the further test and selection procedure 409 includes: an KF average residual computing step 501, a first KF residual evaluation step 502, a second KF residual evaluation step 503 and KF residual-difference comparison step 504. In the KF average residual computing step 501 an average value $RAVG_{KF}$ of the plurality of the KF residual values $R_{KF\_1}$-$R_{KF\_NSAT}$, obtained in the KF residual computational step 406, is computed. In the first KF residual evaluation step 502 the average value $RAVG_{KF}$ is compared with a first residual threshold TH_LOWres. If the average value $RAVG_{KF}$ is lower than the first residual threshold TH_LOWres (branch TRUE) the above mentioned counter reset step 306 and KF output step 307 are performed. On the contrary, if the average value $RAVG_{KF}$ is equal to or greater than the first residual threshold TH_LOWres (branch FALSE) the second KF residual evaluation step 503 is performed.

In the second KF residual evaluation step 503, the average value $RAVG_{KF}$ is compared with a second residual threshold TH_HIGHLOWres, which is greater than the first residual threshold TH_LOWres. As an example, the first residual threshold. TH_LOWres is 25 meters and the second residual threshold TH_HIGHLOWres is 60 meters. If the average value $RAVG_{KF}$ is equal to or lower than the second residual threshold TH_HIGHLOWres (branch FALSE), the KF residual-distance comparison step 504 is performed. In the KF residual-distance comparison step 504, a KF maximum absolute value of the above mentioned KF residual values, $R_{KF\_1}$-$R_{KF\_NSAT}$, $max(RES_{KF})$ is selected, and compared with a third residual threshold. The third residual threshold can be, particularly, the metric $\|\Delta P\|$ of the position distance $\Delta P$ as computed in the further comparing step 310 (FIG. 4). If the metric $\|\Delta P\|$ is greater than the KF maximum absolute value, $max(RES_{KF})$, (branch TRUE) the above mentioned counter reset step 306 and KF output step 307 are performed. According to another embodiment, in the residual-distance comparison step 504, the metric $\|\Delta P\|$ is compared with a quantity obtained by multiplying the KF maximum absolute value $max(RES_{KF})$ with a coefficient greater than 1, such as equal to 1.5.

With reference to. FIG. 6, if the metric $\|\Delta P\|$ is equal to or lower than the KF maximum absolute value $max(RES_{KF})$ (branch FALSE of the residual-distance comparison step 504) or the average value $RAVG_{KF}$ is greater than the second residual threshold TH_HIGHLOWres (branch TRUE of the KF residual evaluation step 503) an LS output step 505 and a KF resetting step 506 are performed. In the LS output step 505 the selected receiver LS position $P_{LS}$ is then provided as output of the receiver position computing module 10 at the output 18. Moreover, in the KF resetting step 506 the status of the Kalman filter module 12 is reset and the receiver LS position $P_{LS}$ is used as initial status of the Kalman filter module 12 for subsequent receiver position computation.

It is observed that the first KF residual evaluation step 502 and the second KF residual evaluation step 503 allow a quality evaluation of the receiver position $P_{KF}$ performed using parameters obtained from the solution provided by the Kalman filter module 12. Moreover, it is noticed that the residual-distance comparison step 504 allows comparing the qualities of the receiver position solutions $P_{LS}$ and $P_{KF}$ to obtain an indication concerning the possibility that the solution provided by the LS module 11 is more reliable than the solution provide by the Kalman filter module 12.

It is noticed that the above described embodiments of position calculation methods can be employed not only to compute the receiver position but also to compute other cinematic parameters associated with the receiving apparatus 100 (FIG. 1), such as the receiver velocity, acceleration, trajectory, etc. In addition, embodiments of the methods described herein may perform additional acts, may not perform all the described acts, may perform the described acts in various orders, and may modify described acts. For example, in some embodiments comparisons to thresholds described as producing a true result when a value to be compared is less than or equal to a threshold and a false result when the value to be compared is greater than the threshold may be replaced with a comparison that instead produces a true result when the value to be compared is less than the threshold and a false result when the value to be compared is greater than or equal to the threshold, etc.

Figure 7:
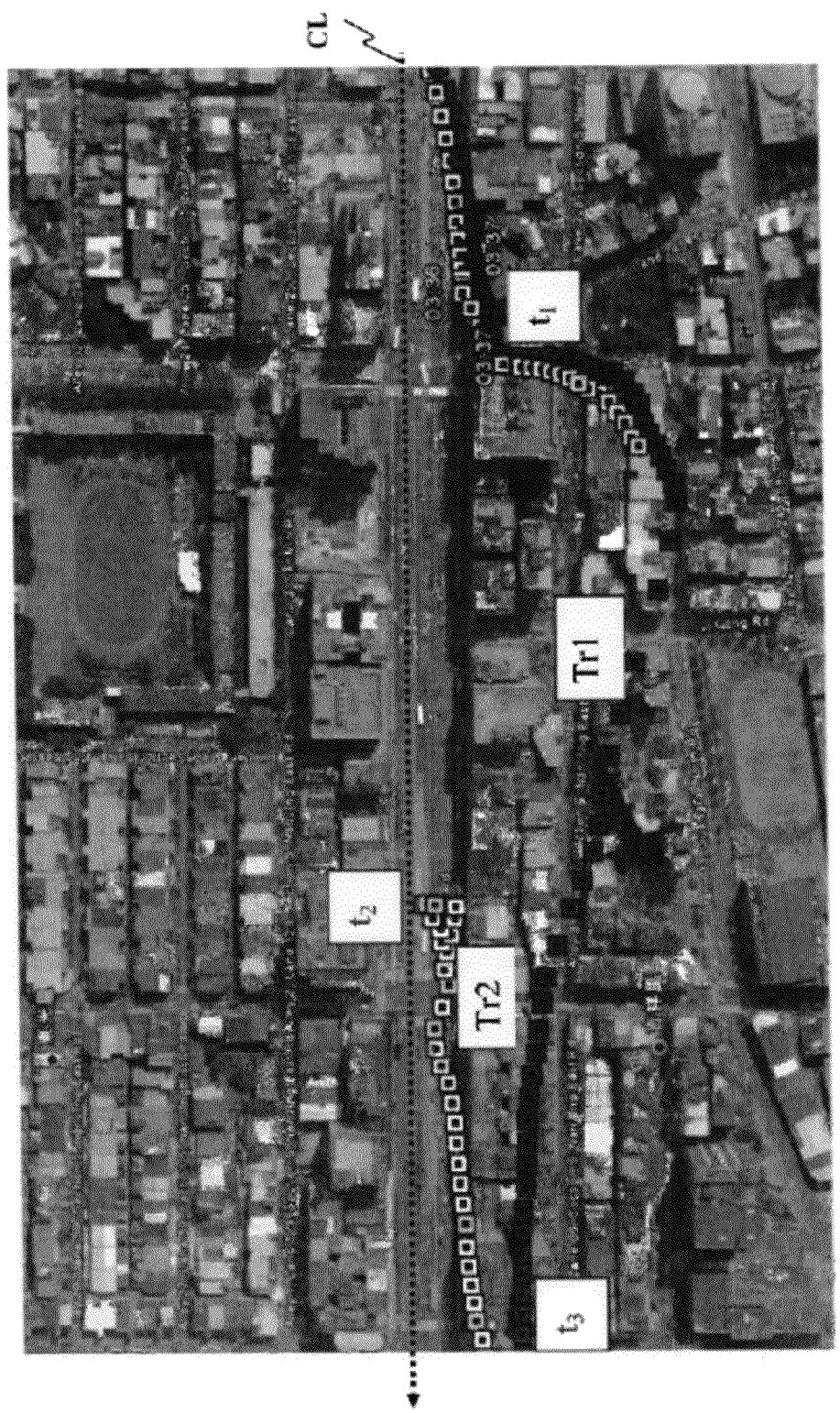
FIG. 7 refers to experimental results and shows a first track of fixes obtained by a known technique and a second track of fixes obtained employing an embodiment of a position computing method described herein.

FIG. 7 shows a comparison of the quality of fixes obtained by experimental tests in which two different GPS receiver apparatus were mounted on a vehicle moving in an urban area from the right side towards the left side of FIG. 7, as indicated by a dotted straight line CL. The dotted samples of FIG. 7 identify a first track of fixes Tr1 obtained by a known technique employing the Kalman filter algorithm for each subsequent fix after the initial one, that has been computed by a Least Square algorithm. The squared samples of FIG. 7 identify a second track of fixes Tr2 obtained by a technique corresponding to the embodiment of the receiver position computing method 300 described with reference to FIGS. 4, 5 and 6. As clear from FIG. 7, after about a time instant $t_1$ the first Tr1 and second Tr2 tracks strongly diverge from the correct line CL. The behaviour of second track line Tr2, referring to the embodiment of the receiver computing position method 300, shows that a substantially correct position is recovered at a time instant $t_2$. While, the behaviour of first track line Tr1, referring to the traditional technique, shows that a substantially correct position is recovered at a time instant $t_3$ which is significantly later that the time instant $t_2$.

Figure 8:
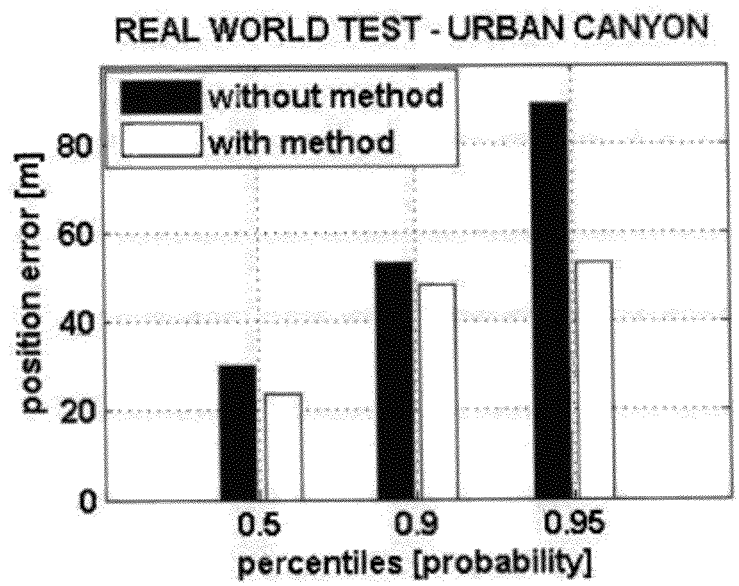
FIG. 8 refers to said experimental results and shows histograms indicating the position error versus the cumulative distribution of probabilities of the position errors.
Figure 9:
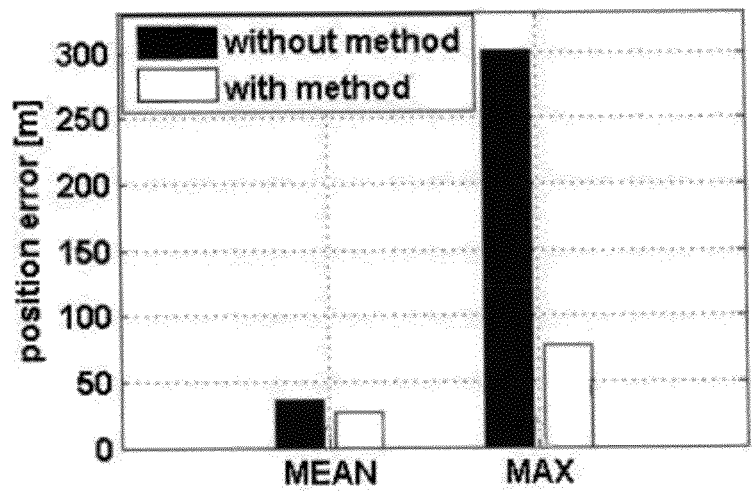
FIG. 9 refers to said experimental results and shows histograms relating to average values and maximum values of the position errors.

FIGS. 8 and 9 shows histograms obtained with reference to the same experiment of FIG. 7. The black histograms refer to the traditional technique while the white histograms refer the second embodiment of the receiver position computing method 300. Particularly, FIG. 8 shows histograms indicating the position error (expressed in meter) versus the cumulative distribution of probabilities (i.e. the cumulative distribution function cdf) of the position error. It is observed that at a cdf of 95% the traditional technique shows an error less than 87 m while the technique in accordance with an embodiment of the receiver computing position method 300 shows an error less 55 m. FIG. 9 allows comparing the average values (MEAN) and the maximum values (MAX) of the position errors obtained according to the traditional technique and an embodiment of the receiver computing position method 300. The maximum value of the position error obtained in accordance with an embodiment of the receiver computing position method 300 is significantly lower than the maximum value of the position error associated with the tradition technique.

The receiving apparatus 100 and the embodiments of the position computational methods above described allow reducing the number of bad quality fixes. It is further noticed that the embodiments described include test steps that reduce the selection of receiver LS positions $P_{LS}$ that are less reliable than the receiver KF position $P_{KF}$.

By employing the above described embodiments reliable receiver positions may be obtained even if the receiving apparatus is operating in an area having many tall buildings producing satellite signals reflections and corresponding noising conditions.

Some embodiments may take the form of or comprise computer program products. For example, according to one embodiment there is provided a computer readable medium comprising a computer program adapted to perform one or more of the methods or functions described above. The medium may be a non-transitory physical storage medium such as for example a Read Only Memory (ROM) chip, or a disk such as a Digital Versatile Disk (DVD-ROM), Compact Disk (CD-ROM), a hard disk, a volatile memory, a non-volatile memory, a network, or a portable media article to be read by an appropriate drive or via an appropriate connection, including as encoded in one or more barcodes or other related codes stored on one or more such computer-readable mediums and being readable by an appropriate reader device. Furthermore, in some embodiments, some or all of the systems and/or modules may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
receiving signals at a receiving apparatus from a plurality of satellites; and
under control of the receiving apparatus,
  processing said signals to provide received data;
  determining a first cinematic parameter value of said receiving apparatus according to a first computational method using said received data;
  determining a second cinematic parameter value of said receiving apparatus according to a second computational method using said received data;
  determining a difference value representing a difference between said first and second cinematic parameter values;
  comparing said difference value with a difference threshold; and
  selecting one of first and second computational methods based at least in part on said comparison.

2. The method of claim 1, further comprising:
determining a reliability of the first computational method based on the received data, wherein selecting one of first and second computational method, comprises selecting the second computational method if the determined reliability is below a reference reliability threshold.

3. The method of claim 2 wherein the determining the reliability of the first computation method comprises determining the reliability based on at least one of the following parameters associated with said received data: a number of used satellites among said plurality of satellites, a dilution of precision DOP, and a carrier to noise ratio CN0.

4. The method of claim 2 wherein selecting one of first and second computational methods comprises a first test and selection procedure including:
evaluating a first solution quality associated with the first cinematic parameter value and a second solution quality associated with the second cinematic parameter value; and
selecting one of first and second computational methods on the basis of said first and second qualities.

5. The method of claim 2, further comprising:
updating a counting value if said determined reliability is greater than the reference reliability threshold;
selecting one of the first and second computational methods based on the counting value and on a counting reference value; and
resetting the counting value and selecting the second computational method if at least one of the following conditions is satisfied:
  said determined reliability is below the reference reliability threshold; and said difference value is less than the difference reference threshold.

6. The method of claim 5 wherein selecting one of the first and second computational methods based on the counting value includes:
selecting the first computational method if the counting value is greater than the counting reference value.

7. The method of claim 4, further comprising:
enabling said first test and selection procedure if a counting value is greater than a counting reference value.

8. The method of claim 7 wherein said first test and selection procedure includes:
computing first method residuals associated with the first cinematic parameter value;
computing a first metric value associated with said first method residuals representing said first solution quality;
computing second method residuals associated with the second cinematic parameter value;
computing a second metric value associated with said second method residuals representing said second solution quality;
resetting the counting value and selecting the second computational method if the second metric value is less than the first metric value; and
performing a second test and selection procedure if the second metric value is greater or equal than the first metric value.

9. The method of claim 8 wherein said second test and selection procedure includes:
computing an average value ($RAVG_{KF}$) of absolute values of said second method residuals;
resetting the counting value and selecting the second computational method if the average value is less than a first average residuals reference value;
selecting the first computational method and resetting the counting value if said average value is greater than a second average residuals reference value that is greater than the first average residuals reference value;
computing a further reference value obtained from a maximum value of absolute values of the second method residuals;
comparing said distance value with said further reference value if the average value is greater than or equal to the first average residuals reference value and is less than or equal to the second average residuals reference value, and generate a corresponding further comparison result data;
resetting the counting value and selecting the second computational method if said further comparison result data indicates that the difference value is greater than the further reference value; and
selecting the first computational method if said further comparison result data indicates that the difference value is less than or equal to the further reference value.

10. The method of claim 9, further comprising:
computing a further maximum value of absolute values of the first method residuals;
selecting the second computational method and resetting the counting value if said further maximum value is greater than a maximum residual reference value;
enabling the first test and selection procedure if said further maximum value is less than or equal to the maximum residual reference value.

11. The method of claim 1 wherein:
said first computational method includes computing the first cinematic parameter value of said receiving apparatus using a data subset of said received data associated with a single time instant; and
said second computational method includes computing the second cinematic parameter value of said receiving apparatus using a plurality of received data associated with a corresponding plurality of time instants.

12. The method of claim 11 wherein:
the first computational method comprises one of a Least Square algorithm LS and a Weighted Least Square algorithm WLS; and
the second computation method algorithm is a Kalman Filter algorithm.

13. The method of claim 1 wherein the first and second cinematic parameter values represent one of the following receiving apparatus cinematic parameters:
position and velocity.

14. The method of claim 1, further comprising:
providing the first cinematic parameter value at an output of said receiver apparatus if the first computational method has been selected; and
providing the second cinematic parameter value at the output of said receiver apparatus if the second computational method has been selected.

15. The method of claim 2, comprising:
resetting a counting value and selecting the second method when at least one of the following conditions is satisfied:
a determined reliability of the first method is below a reference reliability threshold; and
said difference value is less than the difference threshold; and
when said determined reliability is greater than the reference reliability threshold and said difference value is greater than the difference threshold, updating the counting value and selecting one of the first and second methods based on the counting value and on a counting reference value.

16. A receiving apparatus, comprising:
a receiving module configured to receive digitally modulated analog signals from a plurality of satellites and generate corresponding digital received signals;
at least a processing module configured to process said digital received signals and generate received data;
a first computing module configured to compute a first cinematic parameter value of said receiving apparatus according to a first computational method using said received data;
a second computing module configured to compute a second cinematic parameter value of said receiving apparatus according to a second computational method using said received data; and
an output control module configured to:
compute a difference value representing a difference between said first and second cinematic parameter values;
compare said difference value with a reference difference threshold; and
select one of first and second computational methods based on said comparison.

17. The receiving apparatus of claim 16 wherein said output control module is configured to:
process said received data to determine a reliability of the first computational method, wherein selecting one of the first and second computational methods is based on the determined reliability of the first computational method.

18. The receiving apparatus of claim 17 wherein:
said determined reliability of the first computational method is based on at least one of the following parameters associated with said received data: number of used satellites among said plurality of satellites; dilution of precision DOP; and carrier to noise ratio CN0.

19. The receiving apparatus of claim 17 wherein the output control module is configured to perform a first test and selection procedure including:
evaluating a first solution quality associated with the first cinematic parameter value and a second solution quality associated with the second cinematic parameter value; and
selecting one of first and second computational methods on the basis of said first and second qualities.

20. The receiving apparatus of claim 16 wherein:
said first computational method includes determining the first cinematic parameter value of said receiving apparatus using a data subset of said received data associated with a single time instant; and
said second computational method includes determining the second cinematic parameter value of said receiving apparatus using a plurality of received data associated with a corresponding plurality of time instants.

21. The receiving apparatus of claim 20 wherein:
the first computation method is one of the following methods: Least Square algorithm LS and Weighted Least Square algorithm WLS; and
the second computational method is a Kalman Filter algorithm.

22. The receiving apparatus of claim 21 wherein the first and second cinematic parameter values represent one of the following receiving apparatus cinematic parameters: position and velocity.

23. The receiving apparatus of claim 16, further comprising:
a selection module controlled by the output control module; and
an output coupled to said selection module and structured to:
provide the first cinematic parameter value if the first computational method has been selected; and
provide the second cinematic parameter value if the second computational method has been selected.

24. The receiving apparatus of claim 17 wherein the output control module is configured to:
reset a counting value and select the second computational method when at least one of the following conditions is satisfied:
said determined reliability is below a reference reliability threshold; and
said difference value is less than the difference reference threshold; and
when said determined reliability is greater than the reference reliability threshold and the difference value is greater than the difference reference threshold, update the counting value and select one of the first and second computational methods based on the counting value and on a counting reference value.

25. A method, comprising:
receiving signals from a plurality of satellites;
extracting information from the received signals;
selecting between first and second methods of determining a cinematic parameter using the extracted information, the selecting being based at least in part on a difference between results of the first and second methods of determining the cinematic parameter and performed by one or more configured processing devices.

26. The method of claim 25, further comprising determining a reliability of at least one of the methods of determining the cinematic parameter, wherein the selecting is based at least in part on the determined reliability.

27. The method of claim 25, further comprising determining a reliability of one of the methods of determining the cinematic parameter based on the extracted information, wherein the reliability is determined independent of a result of the one of the methods.

28. The method of claim 26 wherein selecting between first and second methods of determining the cinematic parameter comprises:
evaluating a first solution quality associated with a first cinematic parameter value and a second solution quality associated with a second cinematic parameter value; and
selecting one of first and second methods of determining the cinematic parameter on the basis of said first and second qualities.

29. The method of claim 26, further comprising:
resetting a counting value and selecting the second method of determining the cinematic parameter when at least one of the following conditions is satisfied:
said determined reliability is below a reference reliability threshold; and
said difference is less than a difference reference threshold; and
when said determined reliability is greater than the reference reliability threshold and said difference is greater than the difference reference threshold, updating the counting value and selecting one of the first and second methods of determining the cinematic parameter based on the counting value and on a counting reference value.

30. A method, comprising:
receiving signals from a plurality of satellites;
extracting information from the received signals;
determining whether a first method of generating a cinematic parameter from the extracted information is reliable independent of a result of the first method of generating the cinematic parameter;
when it is determined that the first method of generating the cinematic parameter is unreliable, selecting a second method of generating the cinematic parameter from the extracted information; and
when it is determined that the first method of generating the cinematic parameter is reliable, selecting one of the first and second methods of generating the cinematic parameter based at least in part on a difference between results of the first and second methods of generating the cinematic parameter, wherein the determining and selecting are performed by one or more configured processing devices.

31. The method of claim 30 wherein the cinematic parameter is a position, the difference is an absolute value of a distance between a result of the first method and the selecting one of the first and second method comprises comparing the absolute value of the distance to a threshold.

32. The method of claim 30 wherein the first method comprises a least-squares method and the second method comprises a Kalman filtering method.

33. The method of claim 30 wherein selecting one of first and second methods of generating comprises:
evaluating a first solution quality associated with a result of the first method of generating the cinematic parameter and a second solution quality associated with a result of the second method of generating the cinematic parameter; and selecting one of first and second methods based at least in part on said first and second qualities.

34. The method of claim 30, comprising:
resetting a counting value and selecting the second method when at least one of the following conditions is satisfied:
a determined reliability of the first method is below a reference reliability threshold; and
said difference is less than a difference reference threshold; and
when said determined reliability is greater than the reference reliability threshold and said difference is greater than the difference reference threshold, updating the counting value and selecting one of the first and second methods based on the counting value and on a counting reference value.

35. A system, comprising:
means for receiving digitally modulated analog signals from a plurality of satellites;
means for extracting data from the received signals;
first means for generating cinematic parameters based on the extracted data;
second means for generating cinematic parameters based on the extracted data; and
means for selecting an output cinematic parameter coupled to the first means for generating cinematic parameters and to the second means for generating cinematic parameters, and including means for generating differences between cinematic parameters generated by the first means for generating cinematic parameters and cinematic parameters generated by the second means for generating cinematic parameters.

36. The system of claim 35 wherein the means for selecting an output cinematic parameter comprises means for determining a reliability of the first means for generating cinematic parameters based on the extracted data.

37. The system of claim 36 wherein the means for selecting an output cinematic parameter comprises means for evaluating a cinematic parameter generated by the second means for generating cinematic parameters.

38. The system of clam 35 wherein the means for selecting an output cinematic parameter comprises a controller configured to control a switch.

39. The system of claim 36 wherein the means for selecting is configured to:
evaluate a first solution quality associated with a cinematic parameter generated by the first means for generating cinematic parameters;
evaluate a second solution quality associated with a cinematic parameter generated by the second means for generating cinematic parameters; and
select one of the first and second means for generating cinematic parameters based on the first and second solution qualities.

40. The system of claim 35 wherein the means for selecting comprises:
means for comparing generated differences between cinematic parameters to a difference reference threshold.

41. The system of claim 40, comprising:
means for determining a reliability of the first means for generating cinematic parameters; and
means for updating a counting value, wherein the means for selecting is configured to:
reset the counting value and select the second means for generating cinematic parameters when at least one of the following conditions is satisfied:
a determined reliability is below a reference reliability threshold; and
a difference value is less than a difference reference threshold; and
when the determined reliability is greater than the reference reliability threshold and the difference value is greater than the difference reference threshold, update the counting value and select one of the first and second means for generating cinematic parameters based on the counting value and on a counting reference value.

* * * * *